United States Patent [19]
Golker et al.

[11] Patent Number: 5,229,696
[45] Date of Patent: Jul. 20, 1993

[54] SERVOMECHANISM

[75] Inventors: Walter Golker, Freilassing, Austria; Josef Heimann, Munich, Fed. Rep. of Germany

[73] Assignee: Siemens Aktiengesellschaft, Munich, Fed. Rep. of Germany

[21] Appl. No.: 648,886

[22] Filed: Jan. 31, 1991

[30] Foreign Application Priority Data

Apr. 19, 1990 [DE] Fed. Rep. of Germany ....... 4012546

[51] Int. Cl.$^5$ .................. H02K 24/00; G08C 19/46
[52] U.S. Cl. .................. 318/561; 318/138; 318/254; 318/115; 310/184; 310/268
[58] Field of Search ............ 318/138, 254, 439, 560, 318/561; 310/266, 268, 63, 64, 74

[56] References Cited

U.S. PATENT DOCUMENTS

| Re. 31,278 | 6/1983 | Schmider | 310/268 |
|---|---|---|---|
| 2,847,589 | 8/1958 | Haydon . | |
| 3,096,455 | 7/1963 | Hahn . | |
| 3,153,165 | 10/1964 | Henry-Baudot . | |
| 3,719,845 | 3/1973 | Takeda | 310/268 |
| 3,737,697 | 6/1973 | Kitamori et al. | 310/268 |
| 3,993,920 | 11/1976 | Sato . | |
| 4,223,300 | 9/1980 | Wiklund . | |
| 4,394,594 | 7/1983 | Schmider et al. | 310/268 |
| 4,421,997 | 12/1983 | Forys | 310/12 |
| 4,490,637 | 12/1984 | Van de Griend | 310/268 |
| 4,560,893 | 12/1985 | Van de Griend | 310/268 |
| 4,677,332 | 6/1987 | Heyraud | 310/184 |
| 4,677,332 | 6/1987 | Heyraud | 310/184 |
| 4,737,675 | 4/1988 | Maemine et al. | 310/268 |
| 4,748,387 | 5/1988 | Tanuma et al. | 318/138 |
| 4,763,403 | 8/1988 | Klein et al. | 310/268 |
| 4,804,574 | 2/1989 | Osawa et al. | 310/184 |
| 4,829,247 | 5/1989 | Wallrafen . | |
| 4,839,551 | 6/1989 | Tomisawa | 310/184 |
| 5,036,239 | 7/1991 | Yamaguchi | 310/268 |
| 5,039,895 | 8/1991 | Meister | 310/184 |
| 5,099,162 | 3/1992 | Sawada | 310/198 |

FOREIGN PATENT DOCUMENTS

| 0259538 | 3/1988 | European Pat. Off. . |
| 3724349 | 2/1989 | Fed. Rep. of Germany . |
| 2381284 | 9/1978 | France . |

OTHER PUBLICATIONS

Mechanical Engineering vol. 107, No. 6, Jun. 1985, New York, USA, entitled: "Motion Sensors in Industrial Robots".
Aulmann, "Bausteine für die Übertragung und Verarbeitung von Winkelinformationen, "Funk-Technik, 1970, No. 1, pp. 14-16, 49-52.

Primary Examiner—Paul Ip
Attorney, Agent, or Firm—Hill, Steadman & Simpson

[57] ABSTRACT

In a servomechanism, the stator and the rotor each have disk-shaped iron parts between which a disk-ring-shaped axial air gap is formed. The stator and rotor windings are fashioned as spiral-shaped conductor paths/interconnects on insulating layers which are glued onto the end surfaces of the iron parts of the stator and the rotor resulting in a very short axial length servomechanism. In addition, the null voltage is reduced due to the elimination of winding heads.

13 Claims, 2 Drawing Sheets

SERVOMECHANISM

BACKGROUND OF THE INVENTION

1. Field of the Invention:

The present invention relates to a servomechanism having a housing, a stator with at least one stator winding, the stator being firmly connected with the housing, and a rotor with at least one rotor winding, the rotor being mounted in the housing via a rotor shaft.

2. Description of the Prior Art

Servomechanisms which are also known as synchros or resolvers are used for the transmission of angular information. The structure and operation of these servomechanisms are described, for example, in the publication "Funktechnik" 1970, pp. 14–16 and 49–52. In the conventional structure of servomechanisms, the stator and the rotor are respectively composed of laminated stacks having slots therein in which one or more windings reside. The rotor windings are connected either via sliding contacts or via a rotatable transformer. Due to the air gap between the stator and the rotor, a primary winding and a secondary winding are therefore coupled with each other. When an alternating voltage energized the primary winding, it generates a secondary voltage in the secondary winding, which is varied between 0 and a maximum value, depending on the angular position between the stator and the rotor.

In the case of the above-described structure of the conventional servomechanisms, a so-called null-voltage is caused by the coil winding head, i.e. by the non-active part of the winding and by different magnetic saturation in the sloted, laminated stacks of the stator and the rotor, the null-voltage causing in a connected servosystem an undesired additional heating. This null voltage is additionally influenced by the sharpening burr at the slot edges and metal separation points of the stator stack and the rotor stack. Another error source in a servomechanism is the first harmonic wave in the electrical error, caused by winding insertion errors, errors in the number of turns in individual coils or by magnetic asymmetry in the iron circuit. Such asymmetry result from out-of-roundness of the stator bore or of the outer diameter of the rotor, as well as from eccentric integration of the laminated stacks and also from irregular layering of the laminated stacks because the metals, in and across the grain, have a different magnetic conductivity approximately in a ratio of 4:1. Also, the slots in the rotor and in the stator influence, via harmonics of the slots, the electrical error of the servomechanism.

For certain applications, the conventional servomechanisms are also too long in the axial direction. Although one could reduce the structural length for the corresponding change of the construction, such changes require very high investments in manufacturing for each variation. Furthermore, the above-described disadvantages of this structure would still not be eliminated given a shortening of the axis.

SUMMARY OF THE INVENTION

It is the object of the present invention to provide a servomechanism which not only enables a very short axial length, but also the manufacturing of the stator and the rotor with a considerably lower manufacturing effort and which simultaneously contributes to a reduction of the electrical error, particulary the null-voltage.

In the case of a servomechanism of the type initially set forth above, and according to the present invention, the above object is achieved in that the stator and the rotor are arranged oppositely from one another with end planes extending vertically with respect to the axis of rotation forming a ring-disk-shaped axial air gap, and in that the windings of the stator and of the rotor are respectively fashioned as a winding disk with conductor spirals arranged in one plane whose axes are arranged in a parallel fashion with respect to the rotor axis and distributed symmetrically thereabout.

Due to the fashioning of the windings in the servomechanism in the form of conductor spirals, which can be manufactured, for example, as etched conductor paths/interconnects, the errors in the number of turns or in the winding insertion are eliminated. Since no slots are present, there are no undesired harmonics of the slots either. Moreover, the null-voltage is lower than in conventional servomechanisms since the iron circuit needs no longer be operated mechanically and because the coil winding head is missing due to the winding arrangement. The structure of the present invention also results in a clearly lower manufacturing expense since the layering and insulating of the laminated stacks and the winding and the fastening of the coils in the slots are eliminated. Also eliminated is the mechanical final processing.

According to the present invention, the air gap of the servomechanism is an axial air gap between the end planes of the stator and the rotor. In the manufacturing process, this air gap must be adjusted to a minimum since the phase shift between the input voltage and the output voltage of the servomechanism depends on the size of the air gap. If the air gap in the servomechanism constructed in accordance with the present invention cannot be adjusted as small as the radial air gap in conventional servomechanisms, it is advisable to select the exciting frequency in the range of 1–20 kHz in order to keep the phase shift low.

In accordance with an advantageous embodiment of the invention, the stator and the rotor respectively have a disk-shaped or pot-shaped iron part with end planes facing one another, whereby the winding disks are fastened on these end planes. Thereby, it is possible that the conductor spirals of the winding disks are fashioned as (e.g. etched) conductive layers on the end planes of the stator iron part or the rotor iron part with insulating layers as separators. Likewise advantageous is an embodiment wherein the winding disks are respectively fashioned as disk-shaped foils with conductor spirals applied on at least one surface, and these foils are glued onto the iron part of the stator or the rotor. In this case, it is useful to fashion oppositely-residing same-direction conductor spirals respectively on both sides of the foils, which jointly constitute a partial winding. In a preferred embodiment, the conductor spirals or partial windings arranged in adjacent fashion in the peripheral direction respectively have opposite winding directions and therefore constitute magnetic pole pairs. A particularly good apportionment of the circular plane on the winding disks results when, in one winding plane, respectively six conductor spirals or partial windings distributed around the axis of rotation of the rotor or of the stator are arranged with alternatingly opposite winding directions.

Since, for the recognition of the turning direction, advantageously two secondary windings are provided, the stator or the rotor preferably, however, the stator, has two winding disks, whereby a first of these winding disks carries a sine winding and the second winding disk carries a cosine winding offset electrically by 90°. Accordingly, in the case of the above-mentioned preferred pole pair number of 3 (3-speed servomechanism) the sine-winding disk is offset relative to the cosine winding disk mechanically by 30°. The rotor has only one winding disk in this case. In some cases, a second winding can be provided, however, as a short-circuit winding. In this case, the winding is offset relative to the actual rotor winding electrically by 90°.

The power supply to the rotor can occur in a known manner via a rotatable transformer. Thereby it is advisable to fashion the transformer-rotor core as one piece with the iron part of the rotor. The windings of the rotatable transformer can be applied in the conventional manner. For the purpose of an optimally-short construction, however, it is also possible to fashion these windings likewise as winding disks with spiral-shaped conductor paths, if the achievable number of windings suffices.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
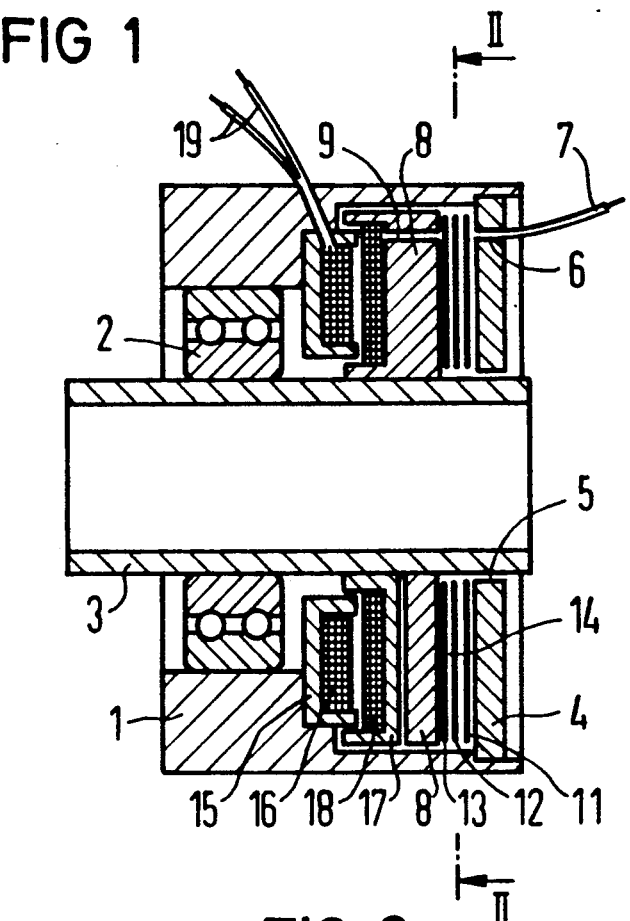
FIG. 1 is a longitudinal sectional view of a servomechanism constructed in accordance with the present invention.
Figure 2:
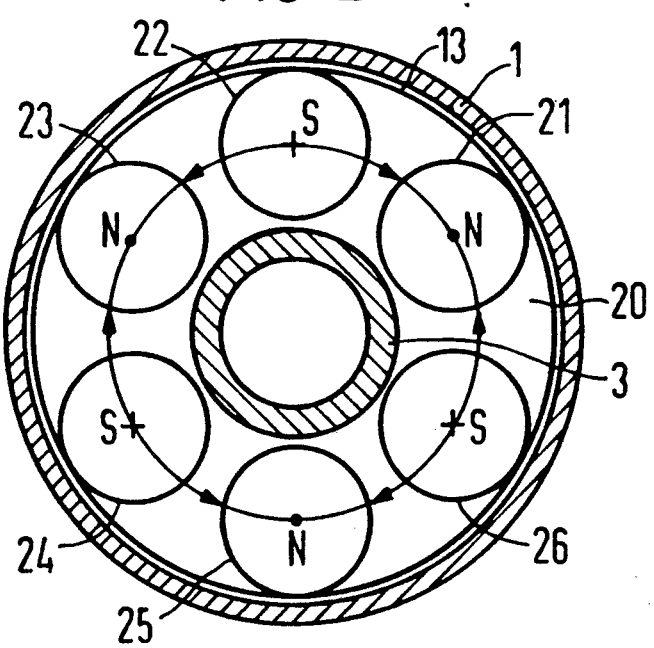
FIG. 2 is a cross-sectional view of the servomechanism of FIG. 1 taken substantially along the parting line II—II.

Referring to FIGS. 1 and 2, a servomechanism is illustrated as comprising a housing 1, in which a rotor shaft 3 is rotatably mounted and supported by a bearing 2. A disk-shaped stator iron part 4 is firmly connected the housing 1 and comprises a central recess 5 coaxial with the axis of rotation of the hollow rotor shaft 3, as well as one or more holes 6 extending therethrough for receiving electrical connections 7 for the stator winding. A rotor iron part 8 is mounted on the rotor shaft 3 and is basically also fashioned along the lines of the iron part 4 as a flat-smooth disk and has a hole 9 therethrough for receiving the connection to the rotor winding which will be described below. The iron parts 4 and 8 are respectively pressed in one piece from a plastic-enveloped iron powder.

The stator has two windings in the form of winding disks, namely one sine winding 11 and one cosine winding 12. The rotor has a rotor winding 13, likewise in the form of the winding disk. The two stator windings 11 and 12 are glued on the stator iron part 4, whereas the rotor winding 13 is glued on the iron part 8 of the rotor. A servomechanism air gap 14 is formed therebetween as an axial air gap.

As also illustrated in FIG. 1, the power supply to the rotor occurs via a rotatable transformer composed of a stator core 15 with a stator coil 16 and a rotor core 17 with a rotor coil 18. The rotor coil 18 is connected with the rotor winding 13 via the hole 9. The stator winding 16 is connected with an alternating voltage source via the connecting lines 19. Only the bottom half of FIG. 1 illustrates a separated rotor core 17. As shown in the upper half of FIG. 1, this rotor core can be fashioned as a single piece with the rotor iron part 8 of the servomechanism whereby the number of parts is reduced. Also possible would be a transfer of the power supply to the rotor via slip rings.

The construction of the windings 11, 12 and 13 of the servomechanism is respectively the same. This construction will now be explained with the rotor winding 13 visible in FIG. 2. Each of the winding disks illustrated in FIG. 1 is composed of a foil disk 20 on which six partial windings 21-26 are fashioned in the form of spiral-shaped conductor paths/interconnects in a circle about the axis of rotation. The winding direction, or respectively, the spiral direction of these partial windings is alternately clockwise and counterclockwise, so that on the rotor, alternatingly unlike poles are generated, in FIG. 2 denoted with N and S, i.e. altogether three pole pairs or six poles.

Figure 3:
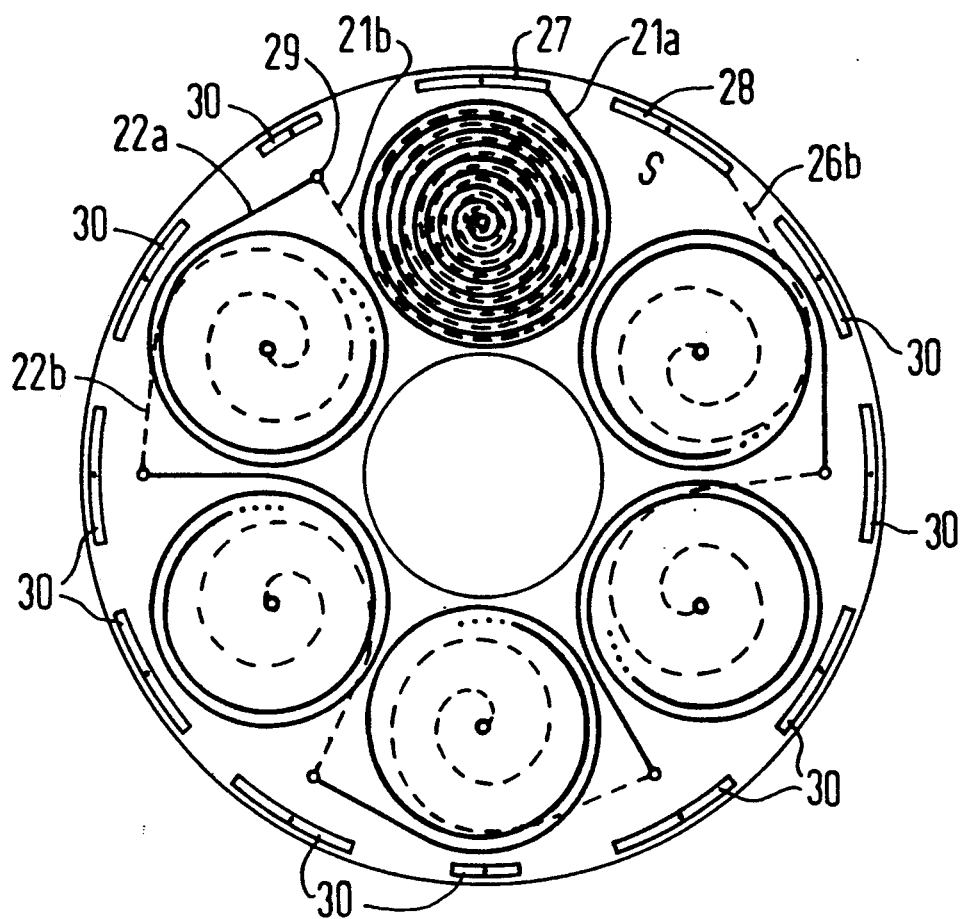
FIG. 3 is a plan view on the enlarged front side of a winding disk.

The structure of a winding disk is illustrated in FIG. 3 in a somewhat enlarged fashion. On the edge, the foil disk 20 has two conductive mounting surfaces 27 and 28. From the mounting surface 27, a conductor path 21a extends in a spiral-shaped fashion to the inside, namely clockwise as shown, until it reaches a center point of the winding. There, the conductor path is connected through to the opposite surface of the foil 20 and, on the opposite side, continued from the inside to the outside again in a spiral-shaped fashion. This rear side conductor path 21b also extends in a clockwise fashion so that, together with the front-side conductor path 21a, generates the joint partial winding. The end of the conductor path 21b is guided to a contact point 29 which, in turn, is connected in a conductive fashion with a conductor path 22a located on the front side. The conductor path/strip 22a is wound in a spiral-shaped fashion, this time counterclockwise, throughcontacted in the center and continued on the rear side in the form of a spiral-shaped conductor path 22b for the formation of a partial winding 22. The other partial windings 23-26 are generated in the same manner with alternating winding directions, whereby the end of the conductor path 26b is connected with the mounting surface 28 from the rear side. The other metallic surfaces 30 serve, for example, for soldering two winding disks in the case of a stator winding.

Figure 4:
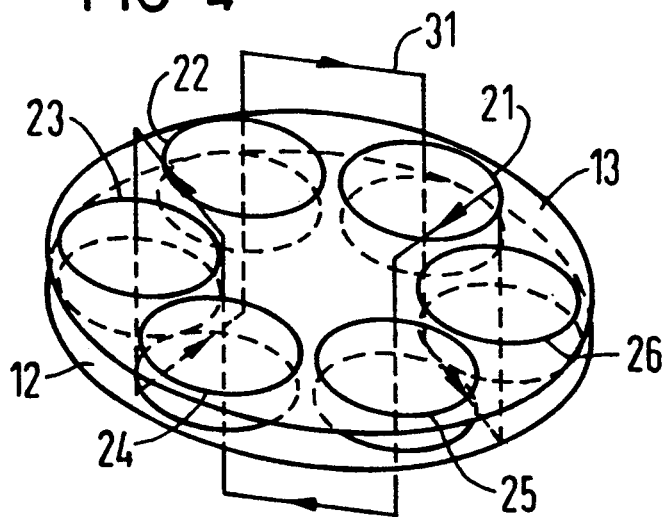
FIG. 4 is a schematic illustration of the magnetic field between two winding disks residing opposite one another.

FIG. 4 schematically illustrates the field distribution between two winding disks, for example the rotor winding 13 and the cosine winding 12. When a current is passed through the winding composed of the partial windings 21-26 of the disk 13 according to FIG. 3, a magnetic field distribution 31 results which also permeates the parallel winding disk 12. As far as the partial windings of the disk 12 reside in congruent fashion opposite from the partial windings of the disk 13, the maximal value of a secondary voltage will be induced. Due to a mutual rotation of the disks 13 and 12, a sine-shaped voltage curve in the secondary winding 12 results. If a second secondary winding is added which is offset electrically by 90°, a correspondingly-offset voltage curve is generated in this winding as well. In this manner it is possible as in a conventional servomechanism to transmit the angle of rotation by taking the voltage signals from the secondary windings.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A servomechanism comprising:
   a housing including a central axis;
   a shaft mounted in said housing for rotation about said axis;
   a first planar iron disk mounted fixed in said housing perpendicular to said shaft as a stator;
   a second planar iron disk mounted on said shaft for rotation therewith and in said housing spaced from said first stator disk as a rotor;
   each of said first and second disks including a surface facing the other of said disks;
   first and second disk-shaped insulators mounted coaxially and layered on said surface of said first disk;
   a printed conductor stator sine winding carried on said first disk-shaped insulator;
   a printed conductor stator cosine winding, electrically connected to and offset by 90° with respect to said sine winding, carried on said second disk-shaped insulator;
   a third disk-shaped insulator mounted on said surface of said rotor disk; and
   a printed conductor rotor winding carried on said third disk-shaped insulator.

2. The servomechanism of claim 1, wherein:
   each of said sine, cosine and rotor windings comprises conductive spirals.

3. The servomechanism of claim 1, wherein:
   each of said first, second and third disk-shaped insulator comprises an insulating foil including opposite surfaces; and
   said sine, cosine and rotor windings each comprise a plurality of conductive spirals mounted on opposite surfaces of said insulating foil peripherally about said axis of rotation and aligned such that the spirals of the same winding direction are located opposite one another and connected in pairs to constitute a respective joint partial winding.

4. The servomechanism of claim 3, wherein:
   adjacent joint partial windings have alternately opposite winding directions to constitute a pair of magnetic poles.

5. The servomechanism of claim 4, wherein:
   each winding plane comprises six conductive spirals having alternately opposite winding directions arranged evenly distributed about said axis of rotation.

6. The servomechanism of claim 1, and further comprising:
   a transformer including a primary winding for connection to an alternating current voltage source and a secondary winding;
   said primary winding fixed in said housing concentric with said axis; and said secondary winding mounted on said rotor disk and electrically connected to said printed conductor rotor winding.

7. The servomechanism of claim 6, and further comprising:
   a rotor transformer core, said rotor transformer core constructed with said rotor disk as a one-piece construction.

8. The servomechanism of claim 6, wherein:
   said sine winding and said cosine winding each comprise a plurality of interconnected planar spiral winding sections of alternate winding directions arranged concentrically about said axis.

9. The servomechanism of claim 8, wherein:
   said primary and said secondary windings of said transformer each comprise a plurality of interconnected planar spiral winding sections.

10. The servomechanism of claim 1, wherein:
    said stator and said rotor disks are each iron parts each comprising sintered, plastic-enveloped iron powder.

11. A servomechanism comprising:
    a housing including an opening therethrough having a first diameter section and a second, larger diameter section about an axis;
    a bearing mounted in said first diameter section;
    a hollow shaft mounted in said bearing for rotation about said axis;
    a planar rotor mounted on and rotatable with said hollow shaft in said second, larger diameter section and including first and second surfaces;
    a transformer including a primary winding fixedly mounted in said housing concentric of said axis, and a secondary winding mounted on said first surface of said rotor concentric of said axis;
    a first insulating disk mounted on said second surface of said rotor;
    a first rotor winding mounted on said first insulating disk, said first rotor winding comprising a plurality of interconnected planar conductive spirals of alternating winding direction arranged peripherally about said axis and connected to said secondary winding to form alternate N and S poles when energized;
    a planar stator including an aperture therethrough freely receiving said hollow shaft therethrough and mounted fixed to said housing in said second, larger diameter section and including a first surface spaced from said second surface of said rotor to define an air gap therebetween;
    second and third insulating disks mounted stacked on said first surface of said stator; and
    second and third stator windings respectively carried on said second and third insulating disks and each comprising a plurality of interconnected planar conductive spirals of alternating winding direction arranged spaced peripherally about said axis, one of said second and third stator windings electrically offset by 90° with respect to the other of said second and third stator windings, said second and third stator windings electrically connected to one another for connection to provide angular information to an external indicator.

12. The servomechanism of claim 11, wherein:
    said housing comprises a bore for receiving the voltage supply conductors therethrough for connection to said primary winding of said transformer.

13. The servomechanism of claim 11, wherein:
    said stator comprises a bore therethrough for receiving output angle information conductors for connection to said stator windings.

* * * * *